US006245426B1

(12) United States Patent
Kornfeldt et al.

(10) Patent No.: US 6,245,426 B1
(45) Date of Patent: Jun. 12, 2001

(54) ELECTRIC DEVICE WITH A POROUS CONDUCTOR INSULATION IMPREGNATED WITH A DIELECTRIC FLUID EXHIBITING A RHEOLOGIC TRANSITION POINT

(75) Inventors: Anna Kornfeldt, Västerås; Bengt Kronberg, Stockholm, both of (SE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 09/214,297

(22) PCT Filed: Jul. 3, 1997

(86) PCT No.: PCT/SE97/01095

§ 371 Date: Feb. 8, 1999

§ 102(e) Date: Feb. 8, 1999

(87) PCT Pub. No.: WO98/01869

PCT Pub. Date: Jan. 15, 1998

(30) Foreign Application Priority Data

Jul. 4, 1996 (SE) .................................................. 9602647

(51) Int. Cl.$^7$ ................................................ B32B 27/00

(52) U.S. Cl. ........................ 428/383; 428/379; 174/23 C; 174/105 SC; 174/102 SC; 174/121 B; 174/121 SR; 174/120 C; 174/120 SC

(58) Field of Search ............................ 508/591; 428/379, 428/383; 174/23 C, 105 SC, 102 SC, 121 B, 121 SR, 120 C, 120 SC, 120 SR

(56) References Cited

U.S. PATENT DOCUMENTS

| | | | | |
|---|---|---|---|---|
| Re. 36,307 | * | 9/1999 | Marin et al. | 173/23 R |
| 3,668,128 | | 6/1972 | Anderson . | |
| 3,780,206 | * | 12/1973 | Reynolds | 174/36 |
| 4,095,039 | * | 6/1978 | Thompson | 174/23 C |
| 4,109,098 | * | 8/1978 | Olsson et al. | 174/106 SC |
| 4,176,240 | * | 11/1979 | Sabia | 174/23 C |
| 4,324,453 | * | 4/1982 | Patel | 174/23 C |
| 4,351,913 | * | 9/1982 | Patel | 523/218 |
| 4,798,853 | * | 1/1989 | Handlin, Jr. | 523/173 |
| 4,807,961 | * | 2/1989 | Mullin et al. | 385/123 |
| 4,852,965 | * | 8/1989 | Millin et al. | 385/123 |
| 4,942,270 | * | 7/1990 | Gamarra | 174/93 |
| 5,281,757 | * | 1/1994 | Marin et al. | 174/23 C |
| 5,481,070 | * | 1/1996 | Hirose et al. | 174/120 SC |

FOREIGN PATENT DOCUMENTS

| | | | |
|---|---|---|---|
| 0058022 | | 8/1982 | (EP) . |
| 0231402 | | 8/1987 | (EP) . |
| 0529957 | | 3/1993 | (EP) . |
| 0586158 | | 3/1994 | (EP) . |
| 2168991A | * | 7/1986 | (GB) . |
| 9704465 | | 2/1997 | (WO) . |

* cited by examiner

*Primary Examiner*—Bruce H. Hess
*Assistant Examiner*—J. M. Gray
(74) *Attorney, Agent, or Firm*—Dykema Gossett PLLC

(57) ABSTRACT

An electric device comprising a conductor and a porous conductor insulation impregnated with a dielectric fluid. Where the dielectric fluid comprises;

a polymer; and a hydrocarbon-based fluid.

The dielectric fluid being composed such that a part of the polymer molecule interacts with the hydrocarbon based fluid or another part in the polymer molecule in such a way that the dielectric fluid;

at temperatures within a first low temperature range is in a highly viscous and elastic, essentially gelled, state;

at elevated temperatures within a second higher temperature range, is in low viscosity easy flowing and essentially newtonian state; and that the viscosity of the dielectric fluid is, over a third limited temperature range, the transition range, changed between the low viscosity state and the highly viscous state. The transition range comprises temperatures between the first and the second temperature ranges.

17 Claims, 1 Drawing Sheet

ELECTRIC DEVICE WITH A POROUS CONDUCTOR INSULATION IMPREGNATED WITH A DIELECTRIC FLUID EXHIBITING A RHEOLOGIC TRANSITION POINT

TECHNICAL FIELD

The present invention relates to an electric device which comprises one or more current- or voltage-carrying bodies, i.e. conductors, and a porous electrical insulation, arranged between or around the conductors, the insulation comprises an open porosity and is impregnated with a dielectric fluid. The present invention relates in particular to an electric device used in high voltage application with a porous electrical conductor insulation comprising a fiber-based material, especially a material containing cellulose-based fibers.

BACKGROUND ART

For a known electric device comprising insulated conductors operating at a high voltage, i.e. a voltage above 100 kV, such as a high-voltage transmission or distribution cable or a power transformer or reactor used in a network for transmission or distribution of electrical power it is known to either use an essentially solid insulation comprising a polymeric material or a porous material impregnated with a dielectric fluid, e.g. an insulation based on cellulose fibers and impregnated with an electric insulating oil. In this application, cellulose fibers mean pulp fibers which contain cellulose and to a varying extent lignin and hemi-cellulose.

Conventional cellulose-based electrical insulations consists of wound or spun layers of tape or of preformed bodies manufactured by dewatering and/or pressing a slurry comprising the cellulosic fibers, commonly known as pressboard. Both wound and preformed insulations are impregnated with an electrically insulating fluid, a dielectric fluid, usually an organic fluid such as an oil. This impregnation is normally carried out prior to, in connection to or after the insulation have been applied around the conductor or between conductors. The active part of the insulation is the cellulose fibers in the paper or the board. The oil protect the insulation against moisture pick-up and fills all pores and voids, whereby the dielectrically weak air is replaced by the oil. It is also known to use porous tapes and boards containing polymer-based man-made fibers in such insulations and also impregnate porous fiber-based insulations with similar dielectric fluids.

The impregnation of these porous fiber-based insulations is time consuming and in case of large volumes to be impregnated such as for long high-voltage direct current transmission cables these impregnation processes are carried out for days or weeks using a strictly controlled temperature cycle to ensure a complete and even impregnation of the fiber-based insulation.

To ensure a good impregnation result, a fluid exhibiting a low-viscosity is desired. But the fluid shall be viscous at normal operation conditions for the electrical device to avoid migration of the fluid in the porous insulation, and especially away from the porous insulation. Darcy's law is often used to describe the flow of a fluid through a porous media.

$$\text{According to Darcy's law: } v = \frac{k\Delta P}{\mu L}$$

In this law v is the so called Darcy velocity of the fluid, defined as the volume flow divided by the sample area, k is the permeability of the porous media, ΔP is the pressure difference across the sample, $\mu$is the dynamical viscosity of the fluid and L is the thickness of the sample. Thus the flow velocity of a fluid within a porous media will be essentially reciprocally proportional to the viscosity. A fluid exhibiting a low-viscosity or a highly temperature dependent viscosity at operating temperature will thus show a tendency to migrate under the influence of temperature fluctuations naturally occurring in an electric device during operation and also due to a temperature gradient building up across a conductor insulation in operation and might result in the formation of unfilled voids in the insulation. Both temperature fluctuations and temperature gradients in conductor insulation will be more expressed in high-voltage direct current devices such as HVDC cables than for most other electric insulations. Unfilled voids will in an insulation operating under an electrical high-voltage direct current field constitute a site where space charges tends to accumulate, thus risking the initiation of dielectric breakdown through discharges which will degrade the insulation and ultimately might lead to its breakdown. Unfilled voids in the insulation as a result of a poor impregnation will have the same effect as described in the foregoing. Thus a dielectric fluid is required that exhibit a low-viscosity under impregnation and is highly viscous under operation conditions.

Conventional dielectric fluid used for impregnating a porous conductor insulation comprised in an electric device, such as a cable, transformer or reactor used in an installation for high-voltage direct current transmission exhibit a viscosity that decreases essentially exponential as the temperature increases. Thus in the high temperature range for impregnation, the temperature has to be increased substantially to gain the required decrease in viscosity due to the low temperature dependence of the viscosity at these temperatures. In comparison the temperature dependence of the-viscosity; as at temperatures prevailing during operation conditions, is very high. Thus small variations in impregnation or operation conditions might have detrimental effect on the performance of the dielectric fluid and the conductor insulation. When using such dielectric fluids they can be chosen such that they are sufficiently viscous at normal operation temperatures to be essentially fully retained in the insulation also under the temperature fluctuations that occurs in the electric device during operation and also that this retention is unaffected of the temperature gradient that normally builds up over a conductor insulation for an electric device comprising conductors at high-voltage. This will mean that the impregnation will have to be carried out at a temperature substantially higher than the operation temperature the insulation is designed to operate at. The high impregnation temperature is needed to ensure that the insulation will be essentially fully impregnated. Such high impregnation temperatures are however disadvantageous as they risk effecting the insulation material, the surfaces properties of the conductor and promotes chemical reactions within and between any material present in the device which insulation is being impregnated. Also energy consumption during production and overall production costs will be negatively affected by a high impregnation temperature. Another aspect to consider is the thermal expansion and shrinkage of the porous insulation which implies that the cooling rate during cooling must be controlled and slow, adding further time to the already time consuming process. For a conventional insulating oil to exhibit a sufficient temperature dependent change in viscosity, a base oil in which a conventionally used polymer, e.g. polyisobuthene, is disolved in exhibits a highly temperature dependent viscosity. This can only be achieved for highly aromatic oils, such as the base oil of T2015 from Dussek Campbell. Such oils exhibits, however, poorer electric properties in comparison with more naphtenic oils, which are oil types suitable for us as insulation oil in an electric device according to the present invention. A more aromatic oil must additionally normally be treated with bleaching earth to exhibit acceptable electric properties. Such processing is costly and there is a risk that small sized clay-particles remains in the oil if not a careful filter- or separation-processing is carried out after this treatment. Alternatively an oil as disclosed in U.S. Pat. No. 3,668,128 can be chosen for its low viscosity at low temperatures. The oil described in U.S. Pat. No. 3,668,128 comprise additions of from 1 up to 50 percent by weight of an alkene polymer with a molecular weight in the range 100–900 derived from an alkene with 3, 4 or 5 carbon atoms, e.g. polybutene. This oil exhibit a low viscosity at low temperatures, good oxidation resistance and also good resistance to gassing, i.e. the evolution of hydrogen gas which might occur, especially when an oil of low aromatic content, as the oil suggested in U.S. Pat. No. 3,668,128, is exposed to electrical fields. The problem, how to retain this low viscosity oil in the cable insulation during the cyclic conditions as to temperature fluctuations or build up of a temperature gradient in the insulation which occurs in a cable or other conductor insulation that during operation is subjected to a high-voltage direct current field is not addressed in this publication. Thus a conductor insulation impregnated with an oil according to the disclosure in U.S. Pat. No. 3,668,128, although offering a major advance on the traditional electrical insulating oil for paper insulated cables, still suffers from the risk of voids being formed in the porous insulation due to migration caused by temperature fluctuations and or temperature gradient building up under operation.

In European Patent Publication EP-A1-0 23 1 402 a gel-forming compound is disclosed that exhibit a slow forming and thermally reversible gelling properties. The gel-forming compound is intended to be used as an encapsulant to ensure a good sealing and blocking of any interstices in the cable insulation such as unbonded interfaces or other internal spaces present between solid insulations, solid semi-conducting shields or layers and conductors in a cable insulated with solid polymeric insulation materials to avoid water from penetrating the insulation by intrusion and spreading along these internal interstices. This slow-forming thermally reversible gel-forming compound comprises an admixture of a polymer to a naphtenic or paraffinic oil and also embodiments using further admixtures of a comonomer and/or a block copolymer and is considered suitable as encapsulant due to its hydrofobic nature and the fact that it can be pumped into the interstices at a temperature below the maximum service temperature of the encapsulant itself. Similar gel-forming compounds for the same purpose, i.e. the use as encapsulant to block water from entering and spreading along interstices and internal surfaces in a cable comprising solid polymeric insulations, solid semi-conducting shields and metallic conductors are also known from the European Patent Publications, EP-A1-0 058 022 and EP-A1-0 586 158. In none of these publications no reference is, however, made to the specific demands put on an insulation for a conductor comprised in a high-voltage direct current apparatus, such as the need to essentially eliminate all unfilled voids or other inhomogenities. Nor is any reference made to the specific demands put on the liquid to fully fill essentially the whole porosity of a porous insulation for this application and be retained in this insulation as the temperature fluctuates and temperature gradients builds up during the operation of such an apparatus. Thus there is no reference of the possibility to use these gel-forming compounds as dielectric fluids in porous, fiber-based conductor insulations and especially not as to whether or not they would be suitable for use under the specific demands put on a dielectric fluid to be used for impregnating a fiber-based conductor insulation in a high-voltage direct current device.

It is an object of the present invention to provide an electric device which exhibit an insulation of its conductors that ensures stable dielectric properties and allows higher opertion temperatures without raising the impregnation temperature.

In particular it is the object of the present invention to provide an electric device as defined in the foregoing objective designed for operation under the specific conditions prevailing for high-voltage direct current devices.

It is therefore the object of the present invention to provide an electric device comprising an electric conductor with a conductor insulation in the form of a porous insulation impregnated with a dielectric fluid that;

exhibits a high viscosity and elasticity at temperatures within a first temperature range, comprising the temperature range in which the electric device is designed to operate such that the dielectric fluid will be essentially retained in the porous insulation at all temperatures in this range, exhibits a low viscosity at elevated temperatures within a second temperature range, comprising the temperature range deemed suitable and technically and economically favourable for impregnation, and that the viscosity within a third limited temperature range between said first and second temperature ranges changes from the high viscosity state exhibited within the first low temperature range to the low viscosity state exhibited within the second elevated temperature range.

This third temperature range shall be narrow to allow impregnation at a temperature closer to the operation temperature in comparision to a electric device impregnated with a conventional dielectric fluid.

It is further the object that the dielectric fluid shall exhibit a low temperature coefficient within both the first and second temperature ranges to ensure stable flow properties and flow behavior within these ranges, and that the change in viscosity within the limited third transition range is substantial, i.e. the change in viscosity is in the order of hundreds of Pas or more.

SUMMARY OF THE INVENTION

To achieve this, an electric device comprising a current- or voltage-carrying body, a conductor, and a conductor insulation with an open porosity and impregnated with a dielectric fluid that according to the present invention comprises an admixture of a polymer to a hydrocarbon-based fluid, the dielectric fluid thus being composed such that a part of the polymer molecule interacts with the hydrocarbon based fluid or another part in the polymer molecule in such a way that the dielectric fluid;

at temperatures within a first low temperature range is in a highly viscous and elastic, essentially gelled, state;

at elevated temperatures within a second higher temperature range, is in low viscosity and essentially newtonian, easy flowing, state; and that over a third limited temperature range, the transition range, the viscosity of the dielectric fluid is changed between the low viscosity state and the highly viscous state. The fluid exhibit viscoelastic properties. The transition range comprises temperatures between the first and the second temperature ranges.

In a preferred embodiment the electric device is arranged with a dielectric fluid that comprises an admixture of a block copolymer to a hydrocarbon-based fluid, composed such;

that the block copolymer comprises at least one block in the block copolymer that exhibits a low solubility in the hydrocarbon-based fluid at temperatures within a first low temperature range, such that the block copolymer is only partly dissolved in the hydrocarbon-based fluid and a highly viscous and elastic gel is formed at temperatures within said first temperature range;

that essentially all blocks in the block copolymer are soluble in the hydrocarbon-based fluid at elevated temperatures within a second higher temperature range, such that a fluid exhibiting low viscosity is formed at temperatures within said second temperature range; and that the solubility of one or more of the blocks in the block copolymer is changed substantially over a third limited temperature range, the transition range, which comprises temperatures between the first and the second temperature ranges, such that the viscosity of the dielectric fluid is changed between the low viscosity and the high viscosity states within over the transition range.

An admixture comprising a di- or tri block copolymer, such as a styrene-butadiene-styrene block polymer or styrene-ethylene-butene-styrene in a hydrocarbon-based fluid, such as an electrical insulation oil based on a mineral oil, exhibits the temperature dependent behavior as described in the foregoing. These admixtures comprising di- or tri block copolymers in an insulation oil will be described in more detail in the enclosed examples.

According to an alternative embodiment the admixture is composed such;

that a part of the polymer when present in the hydrocarbon-based fluid exhibits a high tendency, at temperatures within a first low temperature range, to interact with the hydrocarbon-based fluid and to interact with the same part of other polymer molecules, thereby causing the formation of longer or more branched polymer molecules or cross-linking bridges in the fluid which thereby exhibit the flow properties of a highly viscous and elastic gel at temperatures within said first temperature range;

that this tendency to form longer or more branched molecules or cross-linking bridges is substantially reduced at elevated temperatures within a second higher temperature range, such that a fluid exhibits low viscosity essentially newtonian at temperatures within said second temperature range; and that this tendency to form longer or more branched molecules or cross-linking bridges is substantially changed over a third limited temperature range, the transition range, which comprises temperatures between the first and the second temperature ranges, such that the viscosity of the dielectric fluid is changed between the low viscosity and the high viscosity states within over the transition range and exhibits viscoelastic properties.

Preferably the change between the high and the low viscosity states is reversible.

The dielectric fluids according to the embodiments described in the foregoing exhibits a viscosity at the first lower temperature range, comprising temperatures up to 100° C., preferably temperatures between 0° C. to 80° C., of 10 Pas or more, preferably 100 Pas or more and a viscosity in elevated temperatures in the second temperature range of 200 mPas or less. This second temperature range comprises temperatures of 80° C. or more, preferably temperatures within the range 95° C. to 150° C., favorably this higher range do not include temperatures above 120° C.

An electric device according to the present invention comprising a conductor provided with a porous conductor insulation impregnated with a dielectric fluid as defined in the foregoing exhibit an insulation of its conductors that ensures stable dielectric properties and an essentially improved impregnation process, which reduces the risk for unfilled voids remaining in the insulation after impregnation and also reduce the risk for forming voids in the insulation during operation due to migration of the fluid during operation. It has been found that conditions for impregnation have been improved such that the impregnation time can be shortened and/or the impregnation temperature can be lowered. Of special importance is that an electric device according to the present invention will exhibit a very low migration of dielectric fluid within the insulations or out from them during the special conditions that prevail in an installation for high-voltage direct current transmission of electric power. This is especially important due to the long life such installations are designed for, and the limited access for maintenance to such installations of being installed in remote locations or even sub-sea. One further advantage for a high-voltage direct current cable according to the present invention is that the reduced flow of dielectric fluid within the insulation during operations essentially eliminates or at least substantially reduces the risk oil-drainage in parts of the cable being located at higher levels than other parts which might have been laid at the bottom of the sea. Further the span in operation temperature have for an electric device according to the present invention been extended by raising the upper limit where the fluid is essentialy retained in the insulation. That is the tendency for migration at these raised operation temperatures and thus the risk for formation of voids under such conditions is substantially reduced.

Further developments of the invention are characterized by the features of the additional claims.

In one preferred embodiment an electric cable as defined in the foregoing is designed for operation under the specific conditions prevailing in installations for high-voltage direct current transmission of electric power. Such a HVDC-cable has at its center one or more conductors, preferably the or each conductor comprises a plurality of wires made from a metal which is a good electric conductor such as copper or aluminum or an alloy based on either of them. Outside the conductor is a first semi-conducting shield, preferably made by wounding sheet-paper or tape comprising cellulose-fiber and a conducting particulate material such as soot or carbon black around said core arranged. An insulation likewise produced by wounding or spinning sheet-paper or paper tape comprising cellulose fiber around the first semi-conducting shield. Outside the insulation is a second semi-conducting shield similar to the first arranged. Finally a mantle is arranged to mechanically shield and protect the cable from outside forces and also from water penetration. This mantle normally is made in a metal such as lead or steel and often also comprises a reinforcement in the form of steel wires.

BRIEF DESCRIPTION OF THE DRAWINGS

The present invention shall be described more in detail while referring to the drawings and examples.

DESCRIPTION OF PREFERRED EMBODIMENTS, EXAMPLES.

Figure 1:
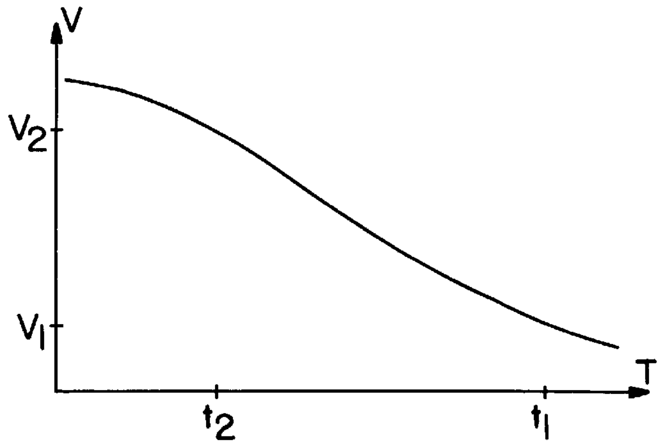
FIG. 1 show a graph illustrating how the viscosity varies with temperature for a dielectric that are used for impregnation of a porous insulation in an electric device according to prior art.

The viscosity V as a function of temperature T for a dielectric fluid used for impregnation of porous insulation in an electric device according to prior art is illustrated in FIG. 1. The temperature or temperature range $t_1$, is the lowest temperature at which the viscosity $v_1$ is sufficiently low to ensure that essentially all voids in a porous material is fully impregnated with the dielectric fluid. The temperature or range of temperatures $t_2$ is the highest temperature at which the viscosity $v_2$ is sufficiently high to ensure that the dielectric fluid is retained in an insulation it has been impregnated into. This temperature $t_2$ is of course much dependent on the overall conditions during operation and will be affected by many parameters. Therefore it has to be an approximated estimate based on empirical knowledge. As the reduction in viscosity with temperature increases as the temperature rises will the temperature $t_1$, to which the fluid need to be heated during impregnation, be relatively high. As the lowest temperature $t_1$ for fully impregnating the insulation is high the energy consumption for impregnation will be high and often there will be a risk for degrading the insulation material. Of course can in some situations a lower impregnation temperature can be used at the cost of a prelonged processing or by adjustment of the formulation to lower the viscosity at a suitable and economically suitable temperature for impregnation. Such an adjustment of the formulation will, however, also lower the viscosity at lower temperatures, i.e. operating temperatures, and the full retention of the dielectric fluid in the insulation during operation is at risk. Consequently, to ensure full retention at operating temperature a dielectric fluid formulation requiring a high degree of impregnation need to be used.

Figure 2:
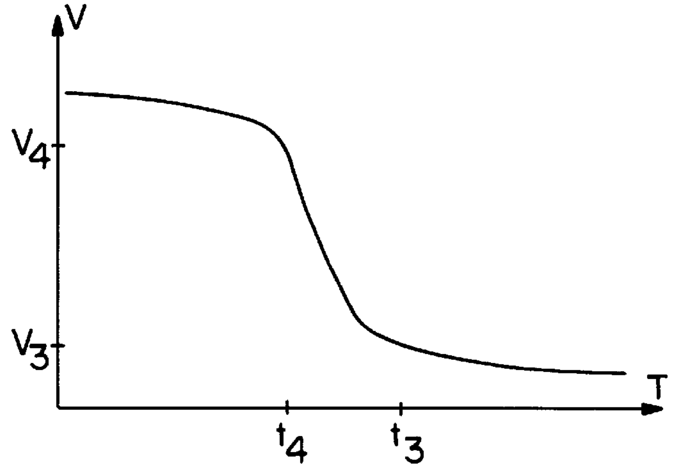
FIG. 2 show a graph illustrating how the viscosity varies with temperature for a dielectric that are used for impregnation of a porous insulation in an electric device according to one embodiment of the present invention.

The temperature dependence of the viscosity for a dielectric fluid such as used in an electric device according to the invention is illustrated in FIG. 2. Temperature or temperature range $t_3$ is the lowest temperature at which the viscosity $V_3$ is sufficiently low to ensure that essentially all voids in a porous material are filled with the dielectric fluid. The temperature or temperature range $t_4$ is the highest temperature at which the viscosity $v_4$ is sufficiently high to ensure that the dielectric fluid is retained in an insulation it has been impregnated into. Temperature $t_4$ as temperature $t_2$ is much dependent on the overall conditions during operation and will be affected by many parameters. Therefore, it is an estimate based on empirical knowledge. The temperature dependence of the dielectric fluid used in a device according to the invention exhibits a typical transition point or a transition zone, i.e. a limited temperature range over which the viscosity changes from its high viscosity state to its low viscosity state and that the viscosity both below and above this transition zone exhibit a low temperature dependence. This change in viscosity with temperature over the transition zone is as described in the foregoing related to a structural change within the dielectric fluid due to the interaction of a functional part in the added polymer with the base fluid or with other parts or groups within the polymer itself. As a result the temperature difference between the lowest impregnation temperature at which an essentially complete impregnation is obtained and the highest safe retention temperature in a dielectric fluid as used in the invention $t_3$–$t_4$ is much lower than the same temperature difference for a dielectric fluid as used in a conventional electric device $t_1$_$t_2$. Thus a lower impregnation temperature can be used without putting the retention during operation at risk even when operating at relatively high operating temperatures. Hereby, stable dielectric properties and an essential elimination or substantial reduction of the tendency to form accumulations of space charges in the insulation during operation can be ensured for an electric device according to the invention. It has shown favorable to use an electric device according to the present invention comprising such a dielectric fluid as shown in FIG. 2 as it offers stable dielectrical properties. It can be expected that the improved conditions for impregnation will result in a reduction in the number of unfilled voids both directly after impregnation and after use at the cyclic temperature fluctuations and build up of temperature gradients in the device that occurs in a device operating under the special conditions that prevails in equipment or installations for high-voltage direct current transmission of electric power.

Of special importance is that an electric device according to the present invention will exhibit a very low migration of dielectric fluid within the insulations or out from them during the special conditions that prevail in an installation for high-voltage direct current transmission of electric power. This is especially important due to the long life such installations are designed for and the limited access for maintenance to such installations of being installed in remote locations or even sub-sea. One further advantage for a high-voltage direct current cable according to the present invention is that the reduced flow of dielectric fluid within the insulation even during operations at high temperatures essentially eliminates or at least substantially reduces the risk oil-drainage in parts of the cable being located at higher levels than other parts which might have been laid at the bottom of the sea.

Figure 3:
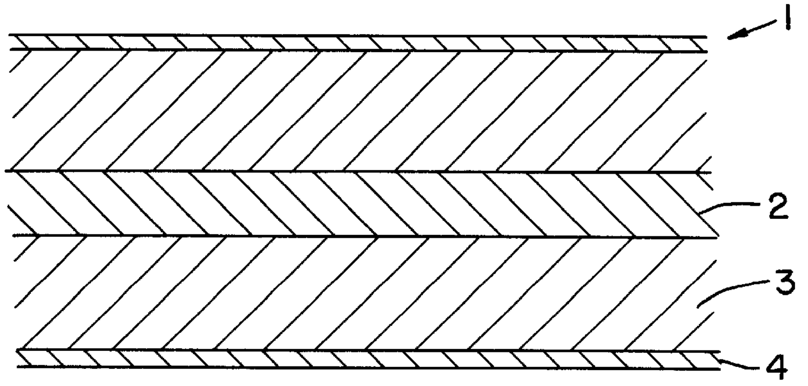
FIG. 3 shows a section-view of a cable for high-voltage direct current transmission of electric power according to one embodiment of the present invention.

A schematic representation of one embodiment of the cable of the invention is shown in longitudinal section as item 1 in FIG. 3. The embodiment shown includes a conductor 2, an insulator 3, and a mantle 4.

EXAMPLE 1

A dielectric fluid was prepared by adding a styrene-butadiene-styrene, block copolymer, often called SBS, a di-block copolymer with a high butadiene content to an insulating oil based on a mineral oil with a high content of naphtenics.

On addition to the oil the styrene-butadiene block copolymer is selectively dissolved as polystyrene and polybutadiene exhibit differentiated solubility. This results in a micro-separation of this two polymer-blocks. In this low aromatic oil the solubility of polystyrene is low in the low temperature ranges and as the concentration of undissolved polystyrene becomes sufficiently high a micell-like structure essentially of polybutene is formed in the fluid around a nucleous of undisolved polystyrene. This micell-like structure interacts resulting in an increased viscosity at lower temperatures. At higher temperatures the solubility of polystyrene is increased and the micell-like structure is destroyed resulting in a drastic reduction in viscosity. The temperature range for this phase transition will depend on polymer concentration, as the interaction between the polymers, causing the development of a network at high concentrations can occure even when a large portion of the polystyrene is dissolved. The temperature range for the transition, $t_4 - t_3$ has been found to vary between 60 and 75° C. for concentrations of 3–7% by weight.

EXAMPLE 2

A dielectric fluid was prepared by adding a styrene-butadiene-styrene block copolymer; SBS, a di-block copolymer with a high butadiene content but with a lower number average molecular weight in to the block polymer used in Example 1, to a insulating oil based on a mineral oil with a high content of naphtenics.

The resulting oil exhibit in principle the same solubility, development of a network like structure at low temperatures and a phase transition were the network structure is broken at higher temperatures as already discussed under example 1. The temperature range for the phase transition $t_4 - t_3$ was found to be between 50 and 55° C. for concentrations of 3 to 7% by weight.

EXAMPLE 3

As for example 1 but the styrene-butadiene-styrene block copolymer was replaced by Styrene-Ethylene-Butene-Styrene block copolymer, SEBS.

The resulting oil exhibit in principle the same solubility, development of a network like structure at low temperatures and a phase transition were the network structure is broken at higher temperatures as already discussed under example 1. The temperature range for the phase transition $t_4 - t_3$ was found to be between 50 and 70° C. for concentrations of 3 to 7% by weight.

The results of these examples have shown that;

the block copolymers added to an oil used for impregnation of a conductor insulation in an electric device according to the present invention dissolves easier in the insulation oil in comparison to a conventionally used polymer, such as polyisobutene, i.e. shorter times and lower temperatures can be used resulting in a reduced risk for damage to the oil or porous insulation, a reduced risk for oxidation thereby improving the electrical properties; and that an oil with better electrical properties can be used, resulting in less pre-processing of the dielectric fluid, no bleaching earth, no filtering at high temperatures, i.e. giving a significant improvement in electrical properties.

Laboratory experiments have shown;

that faster impregnation rates and lower impregnation temperatures can be employed for a dielectric fluid as used in the electric device according to the invention compared to conventionally used dielectric fluids; and that a block of bundled paper impregnated with the fluid as used in an embodiment of the present invention behaves like an elastic body at temperatures below $t_4$ and the oil is at these temperatures fully retained in the porous insulation and between the paper layers. Repeating this last test for oil retention for a conventionally used insulating oil would show a slow flow of oil out from the bundled paper block. Thus the risk for voids appearing during operation is drastically reduced and the electrical properties for the conductor insulation in a device according to the invention improved.

The improvements related to in the foregoing are likely to result in a cable comprising a wound paper-insulation impregnated with the dielectric described in the foregoing where essentially all voids in the insulation is filled by the dielectric fluid , i.e. that the insulation is essentially fully impregnated. Such a cable is also likely to, after use at elevated temperatures and high electrical, essentially static fields, exhibit a low number of unfilled voids and thus be less sensitive to dielectric breakdown.

What is claimed is:

1. An electric DC cable comprising:

at least one conductor;

a first semi-conducting shield disposed around the conductor;

a porous insulation with an open porosity and impregnated with a dielectric fluid such that said porosity is substantially completely filled with said fluid, and thereby substantially free of voids and gas bubbles, outside the first semiconducting shield;

a second semi-conducting shield outside the insulation; and a mantle;

wherein said dielectric fluid comprises a polymer and a hydrocarbon-based fluid, wherein said dielectric fluid is composed such that a part of the polymer molecules interacts with the hydrocarbon-based fluid or another part of the polymer molecule in such a way that the dielectric fluid:

at temperatures within a first low temperature range from about 0° C. to about 100° C. is in a highly viscous and elastic, essentially gelled, state, exhibiting a viscosity of about 10 Pas to about 100 Pas or more;

at elevated temperatures within a second higher temperature range from about 80° C. to about 150° C., is in a low viscosity essentially Newtonian easy flowing state exhibiting a viscosity of 200 mPas or less; and the viscosity of the dielectric fluid is, over a third limited temperature range, the transition range, changed between the low viscosity state and the highly viscous state, and that said transition range comprises temperatures between the first and second temperature ranges.

2. A cable according to claim 1, wherein the conductor insulation in the cable is impregnated with a dielectric fluid comprising:

a block copolymer, and a hydrocarbon-based fluid, the block copolymer comprising at least one block in the block copolymer that exhibits a low solubility in the hydrocarbon-based fluid at temperatures within a first low temperature range, such that the block copolymer is only partly dissolved in the hydrocarbon-based fluid and a highly viscous and elastic gel is formed at temperatures within said first temperature range;

essentially all blocks in the block copolymer are soluble in the hydrocarbon-based fluid at elevated temperatures within a second higher temperature range, such that an essentially Newtonian fluid exhibiting low viscosity is formed at temperatures within said second temperature range; and the solubility of one or more of the blocks in the block copolymer is changed substantially over a third limited temperature range, the transition range, which comprises temperatures between the first and the second temperature ranges, such that the viscosity of the dielectric fluid is charged between the low viscosity and the high viscosity states over the transition range.

3. A cable according to claim 2, wherein the transition between high and low viscosity state exhibited by dielectric fluid is reversible.

4. A cable according to claim 1, wherein the first temperature range includes temperatures from about 0° C. to about 80° C.

5. A cable according to claim 1, wherein the second temperature range includes temperatures from about 95° C. to about 120° C.

6. A cable according to claim 1, wherein the dielectric fluid comprises a di- or tri block copolymer and an electrical insulation oil including an oil selected from the group consisting of mineral oil and mineral oil derivative.

7. A cable according to claim 1, wherein the dielectric fluid comprises a styrene-butadiene-styrene block copolymer and an electrical insulation oil.

8. A cable according to claim 1, wherein the dielectric fluid comprises a styrene-ethylene-butene-styrene block copolymer and an electrical insulation oil.

9. A cable according to claim 1, wherein the hydrocarbon based fluid includes a vegetable oil.

10. A cable according to claim 1, wherein the hydrocarbon-based fluid includes a synthetic oil.

11. A cable according to claim 1, wherein the conductor insulation in the cable is impregnated with a dielectric fluid comprising:

a hydrocarbon-based fluid and a polymer;

a part of the polymer when present in the hydrocarbon-based fluid exhibits a high tendency, at temperatures within a first low temperature range from about 0° C. to about 100° C., to interact with the hydrocarbon-based fluid and to interact with the same part of other polymer molecules, thereby causing the formation of longer or more branched polymer molecules or cross-linking bridges in the fluid which thereby exhibit the flow properties of a highly viscous and elastic gel at temperatures within said first temperature range;

this tendency to form longer or more branched molecules or cross-linking bridges is substantially reduced at elevated temperatures within a second higher temperature range from about 80° C. to about 150° C., such that a fluid exhibits low viscosity and essentially Newtonian behavior at temperatures within said second temperature range; and this tendency to form longer or more branched molecules or cross-linking bridges is substantially changed over a third limited temperature range, the transition range, which comprises temperatures between the first and the second temperature ranges, such that the viscosity of the dielectric fluid is changed between the low viscosity and the high viscosity states over the transition range and exhibits viscoelastic properties.

12. A cable according to claim 11, wherein the transition between high and low viscosity state exhibited by dielectric fluid is reversible.

13. A cable according to claim 11, wherein the first temperature range includes temperatures from about 0° C. to about 80° C.

14. A cable according to claim 11, wherein the second temperature range includes temperatures from about 95° C. to about 120° C.

15. An electric device according to claim 11, wherein the hydrocarbon-based fluid comprises a synthetic oil.

16. A cable according to claim 11, wherein the hydrocarbon based fluid comprises an oil selected from the group consisting of a vegetable oil and a vegetable oil derivative.

17. A method of preparing a high voltage DC cable comprising, providing a conductor, surrounding said conductor with a first semiconducting layer, surrounding said first semiconducting layer with a porous insulating layer, surrounding said insulating layer with a second semiconducting layer, surrounding said second semiconducting layer with a mantle, providing a dielectric fluid wherein said dielectric fluid comprises a polymer and a hydrocarbon-based fluid, wherein said dielectric fluid is composed such that a part of the polymer molecules interact with the hydrocarbon-based fluid or another part of the polymer molecule in such a way that the dielectric fluid:

at temperatures within a first low temperature range from about 0° C. to about 100° C. is in a highly viscous and elastic, essentially gelled, state, exhibiting a viscosity of about 10 Pas to about 100 Pas or more;

at elevated temperatures within a second higher temperature range from about 80° C. to about 150° C., is in a low viscosity essentially Newtonian easy flowing state exhibiting a viscosity of 200 mPas or less; and the viscosity of the dielectric fluid is, over a third limited temperature range, the transition range, changed between the low viscosity state and the highly viscous state, and that said transition range comprises temperatures between the first and second temperature ranges, heating said dielectric fluid to a temperature within said second temperature range, absorbing said dielectric fluid into said porous insulating material so as to substantially fill the pores of said porous insulating material and leave said insulating material substantially void free, and allowing said dielectric fluid to cool to a temperature within said first temperature range.

* * * * *